United States Patent [19]
Takahashi

[11] Patent Number: 5,085,460
[45] Date of Patent: Feb. 4, 1992

[54] WORKING FLUID CIRCUIT FOR AUTOMOTIVE ACTIVE SUSPENSION SYSTEM WITH ENHANCED TAKE-UP CHARACTERISTICS UPON INITIATION OF OPERATION

[75] Inventor: Kenro Takahashi, Kanagawa, Japan

[73] Assignee: Nissan Motor Company, Limited, Japan

[21] Appl. No.: 550,749

[22] Filed: Jul. 10, 1990

[30] Foreign Application Priority Data

Jul. 11, 1989 [JP] Japan .................................. 1-178671

[51] Int. Cl.[5] ............................................ B60G 11/26
[52] U.S. Cl. ..................... 280/707; 280/840; 280/714; 280/DIG. 1
[58] Field of Search ................. 280/707, 772, DIG. 1, 280/714, 840

[56] References Cited

U.S. PATENT DOCUMENTS 4,650,212 3/1987 Yoshimura ........................... 280/707
4,761,022 8/1988 Ohashi ................................. 280/707
4,834,419 5/1989 Kozaki ................................. 280/707

FOREIGN PATENT DOCUMENTS 0249209 12/1987 European Pat. Off. .
0249227 12/1987 European Pat. Off. .
0285153 10/1988 European Pat. Off. .
0286072 10/1988 European Pat. Off. .
63-219408 9/1988 Japan .

Primary Examiner—Kenneth R. Rice
Attorney, Agent, or Firm—Lowe, Price, LeBlanc & Becker

[57] ABSTRACT

An active suspension system is provided a timing control valve in a supply line. The timing control valve is so designed as to provide a predetermined magnitude of delay in building up line pressure upon initiation of suspension control operation. A flow restriction means is further provided in parallel relationship to the timing control valve for permitting fluid flow therethrough in limited flow rate so that sudden increasing of the line pressure in the supply line can be successfully prevented.

17 Claims, 5 Drawing Sheets

WORKING FLUID CIRCUIT FOR AUTOMOTIVE ACTIVE SUSPENSION SYSTEM WITH ENHANCED TAKE-UP CHARACTERISTICS UPON INITIATION OF OPERATION

BACKGROUND OF THE INVENTION

1. Field of the Invention

The present invention relates generally to an active suspension system for an automotive vehicle. More specifically, the invention relates to a working fluid circuit for the active suspension system which prevent vehicular height level from suddenly varying upon initiation of suspension control operation.

2. Description of the Background Art

Japanese Patent First (unexamined) Publication (Tokkai) Showa 63-219408 discloses an active suspension system. The active suspension system, in the prior proposal, has a surge control valve in a supply line of a hydraulic circuit and a flow control valve in a drain line. The flow control valve is responsive to the fluid pressure supplied to the supply line dropping below a predetermined set pressure for blocking fluid flow through the drain line. The flow control valve is associated with a fluid pressure regulation means regulating fluid pressure in the drain line upstream of the flow control valve. The flow control valve and the fluid pressure regulating means are cooperated for maintaining the working fluid pressure in a working chamber of an active cylinder at a predetermined level. Such working fluid circuit construction is effective for preventing the vehicular height from suddenly lowering when control operation is terminated to cause lowering of the fluid pressure to be supplied to the supply line.

However, even by the flow control valve and the fluid pressure regulating means, it is not possible to completely prevent the working fluid from lowering due to leakage of the working fluid and/or to reduction of volume of the working fluid which can be caused by lowering of temperature. This necessarily cause lowering of the fluid pressure in the working chamber and thus results in lowering of the vehicular height from a desired height level.

On the other hand, Japanese Patent First (unexamined) Publication (Tokkai) Showa 63-328499 proposes a working fluid circuit provided therewith a pressure accumulator for absorbing back pressure in a drain line. Absorption of the back pressure in the drain line may reduce resistance of the fluid flow in the drain line and thus improve response characteristics in pressure control in the working chamber. On the other hand, the pressure accumulator tends to serve for lowering fluid pressure below the predetermined pressure level while the drain line is blocked by continuously absorbing the fluid pressure in the closed circuit. This results in sudden variation of the vehicular height level upon resumption of the line pressure, such as upon restarting of the suspension control operation. This clearly cause degradation of the riding comfort.

For improving this, it may be an approach to be taken to adjust the increasing rate of the fluid pressure in the working chamber by means of a pressure control valve. However, upon resumption of the line pressure, the back pressure in the drain line may serve to cause rapid increasing of the output pressure in the working chamber. Therefore, this approach cannot be successful in preventing the vehicular height from causing sudden variation.

SUMMARY OF THE INVENTION

Therefore, it is an object of the present invention to provide an active suspension system which can eliminate sudden variation of vehicular height upon initiation of control operation.

In order to accomplish aforementioned and other objects, an active suspension system, according to the present invention, is provided a timing control valve in a supply line. The timing control valve is so designed as to provide a predetermined magnitude of delay in building up line pressure upon initiation of suspension control operation. A flow restriction means is further provided in parallel relationship to the timing control valve for permitting fluid flow therethrough in limited flow rate so that sudden increasing of the line pressure in the supply line can be successfully prevented.

According to one aspect of the invention, a working fluid circuit system for an active suspension system of an automotive vehicle, comprises;

an active cylinder disposed between a vehicular body and a vehicular wheel and defining therein a working chamber filled with a working fluid and variable of pressure therein;

a pressure source unit for pressurizing the working fluid for circulation, the pressure source unit being connected to a power switch for maintaining operation while the power switch is maintained in ON position;

a fluid circuit connecting the working chamber and the pressure source unit for circulating the working fluid thertethrough;

a pressure control valve means disposed within the fluid circuit for adjusting fluid pressure in the working chamber, the pressure control valve being operable between a first position for introducing pressurized fluid for increasing the fluid pressure in the working chamber, a second position for draining pressurized fluid from the working chamber for decreasing the fluid pressure and a third means for blocking fluid communication between the pressure source unit and the working chamber;

a fluid supply control means disposed in the fluid circuit between the pressure source unit and the pressure control valve means, the fluid supply control means being operable in a first position for supplying pressurized fluid from the pressure source unit to the pressure control valve and a second position for blocking fluid supply therethrough, the fluid supply control means being maintained at the second position while the power switch is maintained OFF position and responsive to ON-set of the power switch to switch the position from the second position to the first position with a predetermined delay period.

The working fluid circuit system may further comprise an operational one-way check valve disposed in a drain line of the fluid circuit between the pressure control valve and the pressure source unit for selectively permitting and blocking fluid flow from the pressure control valve back to the pressure source unit, the operational check valve being variable of valve position between flow permitting position and flow blocking position depending upon the fluid pressure supplied to the pressure control valve through a supply line of the fluid circuit. Also, it is preferable that the fluid supply control means comprises a flow control valve operable between the first and second positions, a by-pass passage by-passing the flow control valve and a flow restriction orifice disposed in the by-pass passage for permitting limited flow rate of fluid flow therethrough. In such case, the flow control valve may be maintained at the second position for the predetermined period after turning ON of the power switch, which predetermined period is set so that the working fluid supplied through the by-pass passage establishes a fluid pressure to be supplied to the pressure control valve higher than a predetermined pressure level.

Alternatively, the fluid supply control means may comprise a flow control valve operable between the first and second positions, a timing control valve and a by-pass passage by-passing the timing control valve and a flow restriction orifice disposed in the by-pass passage for permitting limited flow rate of fluid flow therethrough. In such case, the flow control valve may be maintained at the second position for the predetermined period after turning ON of the power switch, which predetermined period is set so that the working fluid supplied through the by-pass passage establishes a fluid pressure to be supplied to the pressure control valve higher than a predetermined pressure level.

Furthermore, the working fluid circuit system may further comprise a fail detecting means for detecting failure of an active suspension system, and the flow control valve means is responsive to the fail detecting means detecting failure to switch position from the first position to the second position irrespective of the power switch position.

According to another aspect of the invention, an active suspension system for an automotive vehicle, comprises;

an active cylinder disposed between a vehicular body and a vehicular wheel and defining therein a working chamber filled with a working fluid and variable of pressure therein;

a pressure source unit for pressurizing the working fluid for circulation, the pressure source unit being connected to a power switch for maintaining operation while the power switch is maintained in ON position;

a fluid circuit connecting the working chamber and the pressure source unit for circulating the working fluid thertethrough;

a pressure control valve means disposed within the fluid circuit for adjusting fluid pressure in the working chamber, the pressure control valve being operable between a first position for introducing pressurized fluid for increasing the fluid pressure in the working chamber, a second position for draining pressurized fluid from the working chamber for decreasing the fluid pressure and a third means for blocking fluid communication between the pressure source unit and the working chamber;

an active suspension control circuit monitoring vehicular driving condition to produce a control signal for controlling operation of the pressure control valve so as to regulate vehicular height and vehicular attitude, a fluid supply control means disposed in the fluid circuit between the pressure source unit and the pressure control valve means, the fluid supply control means being operable in a first position for supplying pressurized fluid from the pressure source unit to the pressure control valve and a second position for blocking fluid supply therethrough, the fluid supply control means being controlled by the active suspension control unit; and the active suspension control unit being responsive to ON-set of the power switch to command switching of position of the fluid supply control means from the second position to the first position with a predetermined delay period.

Preferably, the active suspension control unit is responsive to turning OFF of the power switch for maintaining operation for a predetermined OFF-set transition period. In such case, the active suspension control unit may be responsive to turning OFF of the power switch to switch the position of the fluid supply control means from the first position to the second position.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
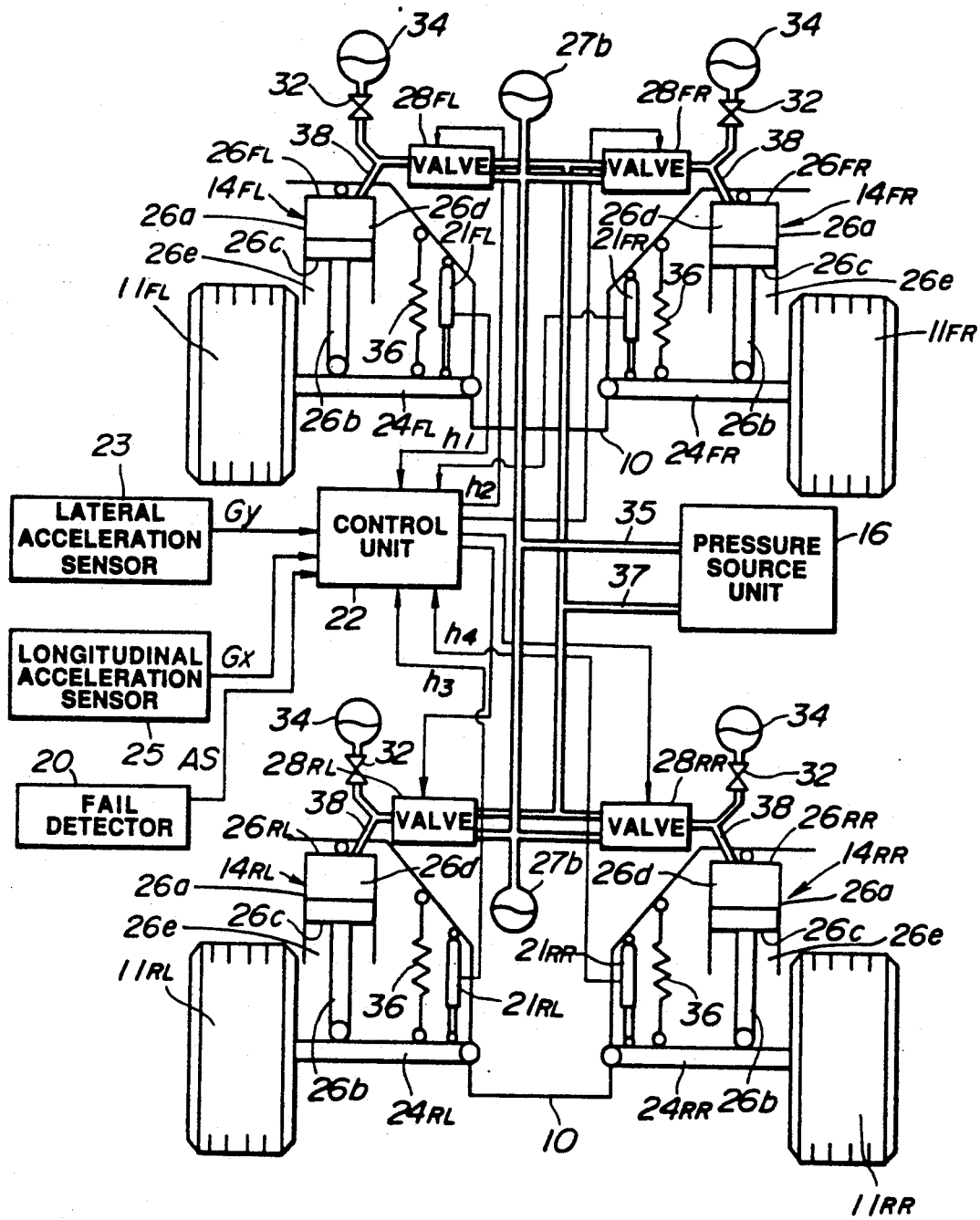
FIG. 1 is a diagrammatical illustration showing the overall construction of the preferred embodiment of an automotive active suspension system which incorporates the preferred construction of a working fluid circuit for performing active suspension control according to the invention.

Referring now to the drawings, particularly to FIG. 1, the preferred embodiment of an active suspension system, according to the present invention, is constituted by an active suspension system which is designed to generally perform suspension control for regulating vehicular height level and vehicular attitude by suppressing relative displacement between a vehicular body 10 and suspension members 24FL, 24FR, 24RL and 24RR provided in front-left, front-right, rear-left and rear-right suspension mechanism 14FL, 14FR, 14RL and 14RR and rotatably supporting front-left, front-right, rear-left and rear-right wheels 11FL, 11FR, 11RL and 11RR.

The suspension member will be hereafter represented by the reference numeral "24" as generally referred to. Similarly, the suspension mechanism as generally referred to will be hereafter represented by the reference numeral "14" Respective front-left, front-right, rear-left and rear-right suspension mechanisms 14FL, 14FR, 14RL and 14RR have hydraulic cylinders 26FL, 26FR, 26RL and 26RR which will be represented by the reference numeral "26" as generally referred to.

Each of the hydraulic cylinder 26 is disposed between the vehicular body 10 and the suspension member 24 to produce a damping force for suppressing relative displacement between the vehicular body and the suspension member. The hydraulic cylinder 26 generally comprises an essentially enclosed cylindrical body 26a defining therein an enclosed chamber. A thrusting piston 26c is thrustingly and slidably disposed within the enclosed chamber of the hydraulic cylinder 26 for defining in the latter a working chamber 26d and a reference pressure chamber 26e. The working chamber 26d may be communicated with the reference pressure chamber 26e via an orifice formed through the piston for fluid communication therebetween in an substantially restricted amount. The piston 26c is connected to the associated one of suspension member 24 via a piston rod 26b. A suspension coil spring 36 employed in the shown type of the suspension system is not required a resilient force in a magnitude required in the ordinary suspension system and only required the resilient force necessary for maintaining the vehicular body about the suspension member.

The working chamber 26d of the hydraulic cylinder 26 is connected to one of pressure control valves 28FL, 28FR, 28RL and 28RR via a pressure control line 38. The pressure control valve 28FL, 28FR, 28RL and 28RR will be hereafter represented by the reference numeral "28" as generally referred to. The pressure control valve 28 is, in turn, connected to a pressure source unit 16 via a supply line 35 and a drain line 37. A branch circuit is provided for connecting the pressure control line 38 to a pressure accumulator 34 via a flow restricting means, such as an orifice 32. Another pressure accumulator 27b is provided in the supply line 35 for accumulating the excessive pressure generated in the pressure source unit 16.

The pressure control valves 28 comprise, though it is not clearly shown in FIG. 1, electrically or electromagnetically operable actuators (reference is made to FIG. 2), such as proportioning solenoids. The actuators are connected to a microprocessor based control unit 22. The control unit 22 is connected to a plurality of vehicular height sensors 21FL, 21FR, 21RL and 21RR which are disposed in respectively associated suspension mechanism and designed for monitoring relative position of the vehicular body 10 and the relevant suspension member 24 to produce vehicular height level indicative signals $h_1$, $h_2$, $h_3$ and $h_4$. The stroke sensor as generally referred to will be represented by the reference numeral 21. The control unit 22 is also connected to a lateral acceleration sensor 23, a longitudinal acceleration sensor 25 and so forth to receive the vehicle driving condition indicative parameters. Based on these control parameters, including the height level indicative signals, a lateral acceleration indicative signal $G_y$ generated by the lateral acceleration sensor, a longitudinal acceleration indicative signal $G_x$ generated by the longitudinal acceleration sensor, and so forth, the control unit performs anti-rolling, anti-pitching and bouncing suppressive suspension controls. A fail detector 20 is also provided for detecting failure of the control system to produce a fail detection signal AS.

While the specific sensors, such as the vehicle height sensors which comprise stroke sensor, the lateral acceleration sensor 23 and the longitudinal acceleration sensor 25, it is possible to replace or add any other sensors which monitor vehicle driving parameter associated with the suspension control. For instance, the stroke sensors employed in the shown embodiment can be replaced with one or more vertical acceleration sensors. Similarly, the lateral acceleration sensor may be replaced with a steering angle sensor for monitoring steering behaviour for assuming lateral force to be exerted on the vehicular body. In the latter case, the parameter indicative of the steering angular displacement may be used in combination of a vehicular speed data since vehicular speed may influence for rolling magnitude of the vehicle during steering operation.

Figure 2:
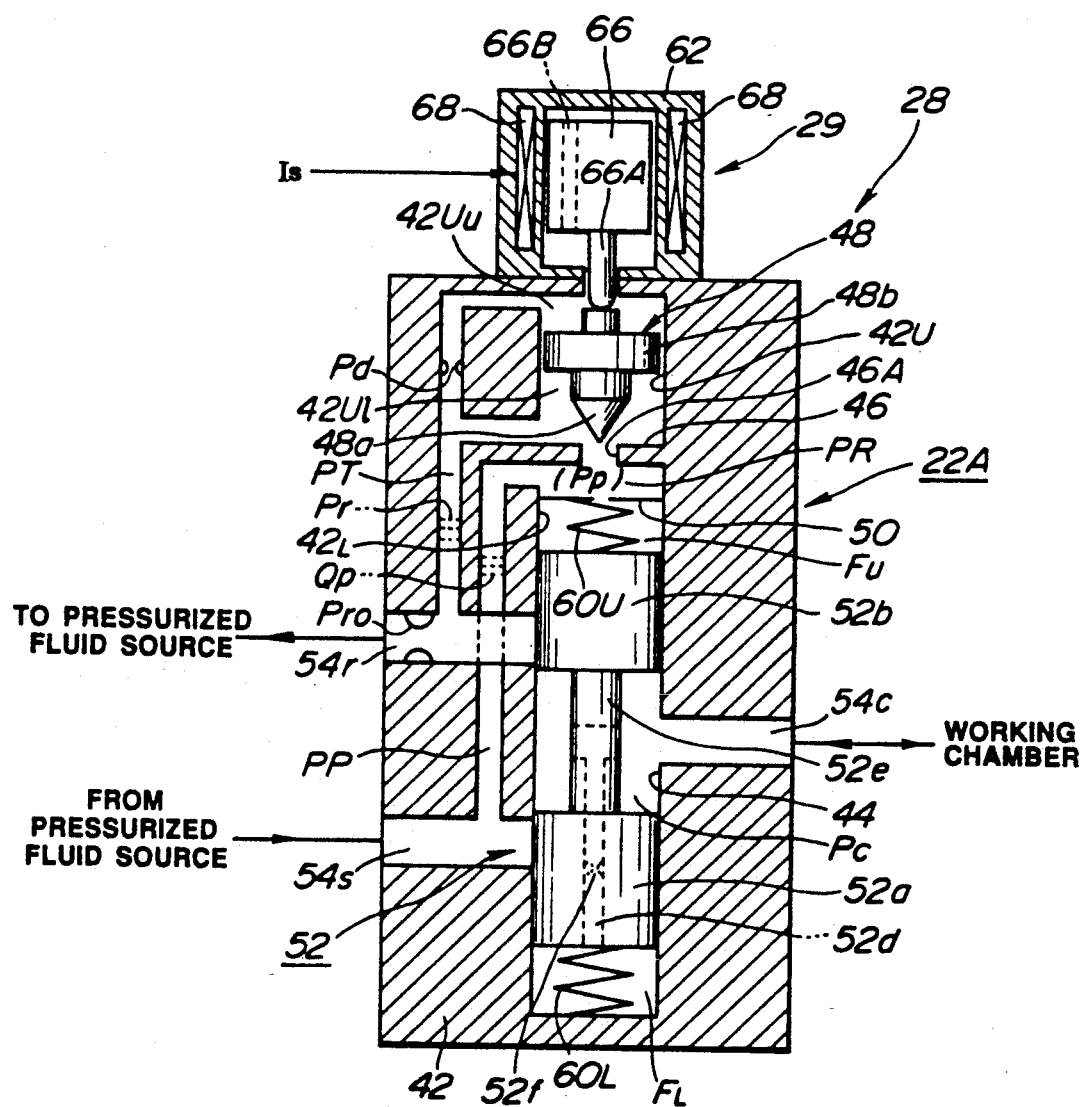
FIG. 2 is a section of one example of an active cylinder in combination with a pressure control valve for adjusting damping characteristics of the active cylinder.

As shown in FIG. 2 in detail, the pressure control valve 28 comprises a proportioning valve assembly and is designed to be controlled by an electric current as a control signal supplied from the control unit 22 for varying valve position according to variation of the current value of the control signal. Generally, the pressure control valve 28 controls magnitude of introduction and draining of pressurized fluid into and from the working chamber 26d for adjusting the pressure in the working chamber. As will be appreciated, since the adjusted fluid pressure in the working fluid determines damping force to be created in response to relative displacement between the vehicle body 10 and the suspension member 24. Mode of the suspension mechanism is varied according to variation of the fluid pressure in the working chamber between a predetermined hardest mode to most soft mode.

In the construction of the pressure control valve shown in FIG. 2, the pressure control valve 28 includes a valve housing 42. The valve housing 42 defines a valve bore 44 which is separated in to a valve chamber 42L and a control chamber 42U by means of a partitioning wall 46. The partitioning wall 46 is formed with a communication path opening 46A for communication between the control chamber 42U and the valve chamber 42L. As seen from FIG. 2, the control chamber 42U and the valve chamber 42L are arranged in alignment to each other across the communication path opening 46A. In parallel to a section of the partitioning wall 46 extending perpendicular to the axis of the valve chamber 42L and the control chamber 42U, a fixed orifice defining partitioning member 50 is provided. The partitioning member 50 defines a throttling orifice which is oriented substantially in alignment with the communication path opening 46A. The partitioning wall 46 and the partitioning member 50 are cooperative for defining a pilot chamber PR therebetween.

A valve spool 52 is thrustingly and slidingly disposed within the valve chamber 42L. The valve spool 52 defines an upper feedback chamber FU between the tip end thereof and the partitioning member 50. The valve spool 52 also defines a lower feedback chamber FL between the other tip end thereof and the bottom of the valve chamber 42L. Offset springs 60U and 60L are disposed within the upper and lower feedback chambers FU and FL, which offset springs exert spring force to the valve spool 52 for resiliently restricting movement of the latter. Resilient force of the offset springs 60U and 60L are so set as to balance to place the valve spool 52 at a neutral position, when the fluid pressure in the upper and lower feedback chambers FU and FL balances to each other. The valve chamber 42L is communicated with a supply line 35 via an supply port 54s, a drain line 37 via a drain port 54r and a pressure control line 38 via a control port 54c, which supply port, drain port and control port are defined in the valve housing 42. The valve spool 52 at the aforementioned neutral position, blocks fluid communication of the pressure control chamber PC with any of the supply port 54s and the drain port 54r. As a result, as long as the valve spool 52 is maintained at the neutral position, overall fluid force in the hydraulic circuit downstream of the pressure control valve, which circuit includes the working chamber 26d of the hydraulic cylinder 26 is held constant.

The valve spool 52 is formed with lands 52a and 52b connected to each other via smaller diameter bar-like section 52e. The land 52a is oriented adjacent the lower feedback chamber FL so as to subject the tip end to the fluid pressure in the lower feedback chamber. Similarly, the land 52b is oriented adjacent the upper feedback chamber FU so as to subject the tip end to the fluid pressure in the upper feedback chamber. The bar-like section 52e between the lands 52a and 52b is cooperative with the peripheral wall of the valve chamber 42L in order to define therebetween a pressure control chamber PC. A fluid flow path 52d is formed through the valve spool 52. The fluid flow path 52d has one end communicated with the pressure control chamber PC and the other end communicated with the lower feedback chamber FL. A fixed flow restricting orifice 52f is formed in the fluid flow path 52d for restricting fluid flow therethrough.

A poppet valve member 48 is disposed within the control chamber 42U for thrusting movement therein. The poppet valve member 48 has a valve head 48a of an essentially conical configuration. The valve head 48a opposes to the communication path opening 46A of the partitioning wall 46. The poppet valve member 48 is operably associated with a proportioning solenoid assembly 29 serving as a actuator. The proportioning solenoid assembly 29 comprises a housing 62 rigidly secured on the valve housing 42 and defining an internal space to receive therein a plunger 66. The plunger 66 has a plunger rod 66A. The tip end of the plunger rod 66A is kept in contact with the tip end of the poppet valve member 48 remote from the valve head 48a. Therefore, the poppet valve member 48 is axially driven by means of the plunger 66 to control the path area in the communication path opening 46A according to the position of the tip end of the plunger rod 66A. Adjusting of the path area in the communication path opening 46A results in variation of fluid pressure to be introduced into the pilot chamber PR.

In order to control the position of the plunger 66 with the plunger rod 66A, a proportioning solenoid coil 68 is housed within the housing 62 and surrounds the plunger 66. The interior space of the housing 62 is connected to the control chamber 42U for fluid communication therebetween. The plunger 66 is formed with a fluid path 66B for fluid communication between upper and lower sections of the interior space. Therefore, the fluid pressure in the upper and lower sections of the interior space of the housing 62 is held equal to the pressure in the control chamber 42U. This cancels fluid pressure to be exerted on the poppet valve and the plunger so that the position of the tip end of the plunger rod 66A can be determined solely depending upon the magnitude of energization of the proportioning solenoid coil 68.

As seen from FIG. 2, the poppet valve member 48 has a cylindrical larger diameter section 48b for separating the control chamber 42U into upper section and lower section 42Uu and 42Ul. The upper and lower sections 42Uu and 42Ul are communicated with the drain port 54r via a pilot return path PT. A multi-stage orifice Pr is provided in the pilot return path PT for restricting fluid flow therethrough. The multi-stage orifice Pr comprises a plurality of strips formed with through openings and is so designed that one of the orifice oriented at most upstream side is mainly effective for restricting fluid flow when fluid flowing therethrough is steady flow and that all of the orifices of respective strips are equally effective for restricting fluid flow when fluid flow therethrough is disturbed and not steady. Therefore, as will be appreciated herefrom, the multi-stage orifice Pr employed in the shown embodiment serves to provide greater fluid flow restriction against non-steady or disturbed fluid flow than that for the steady flow. As seen from FIG. 2, the multi-stage orifice Pr is provided upstream of the upper and lower sections 42Uu and 42Ul. On the other hand, a fixed throttling orifice Pd is provided at an orientation downstream of the lower section 42Ul and upstream of the upper section 42Uu. Similarly, the pilot chamber PR is communicated with the supply port 54s via a pilot path PP. A multi-stage orifice Qp which has similar construction and flow restricting function to that of the multi-stage orifice Pr is provided in the pilot path PP.

A fixed throttle orifice Pro is also provided in the drain port 54r for restricting fluid flow therethrough. The diameter of the fluid path at the orifice Pro is so selected as to create great flow restriction against pulsatile fluid flow cyclically varying the fluid pressure at a frequency approximately 1 Hz.

As can be seen from FIG. 2, the pressure control valve 28 is so arranged as to direct the axis of the valve bore 44 parallel to the longitudinal axis of the vehicle body. The longitudinal acceleration to be exerted on the vehicular body is much smaller than the lateral acceleration and vertical acceleration exerted on the vehicle body. Therefore, by arranging the pressure control valve 28 so that the poppet valve 48 and the valve spool 52 thrustingly move in longitudinal direction, influence of the externally applied acceleration can be minimized.

Figure 3:
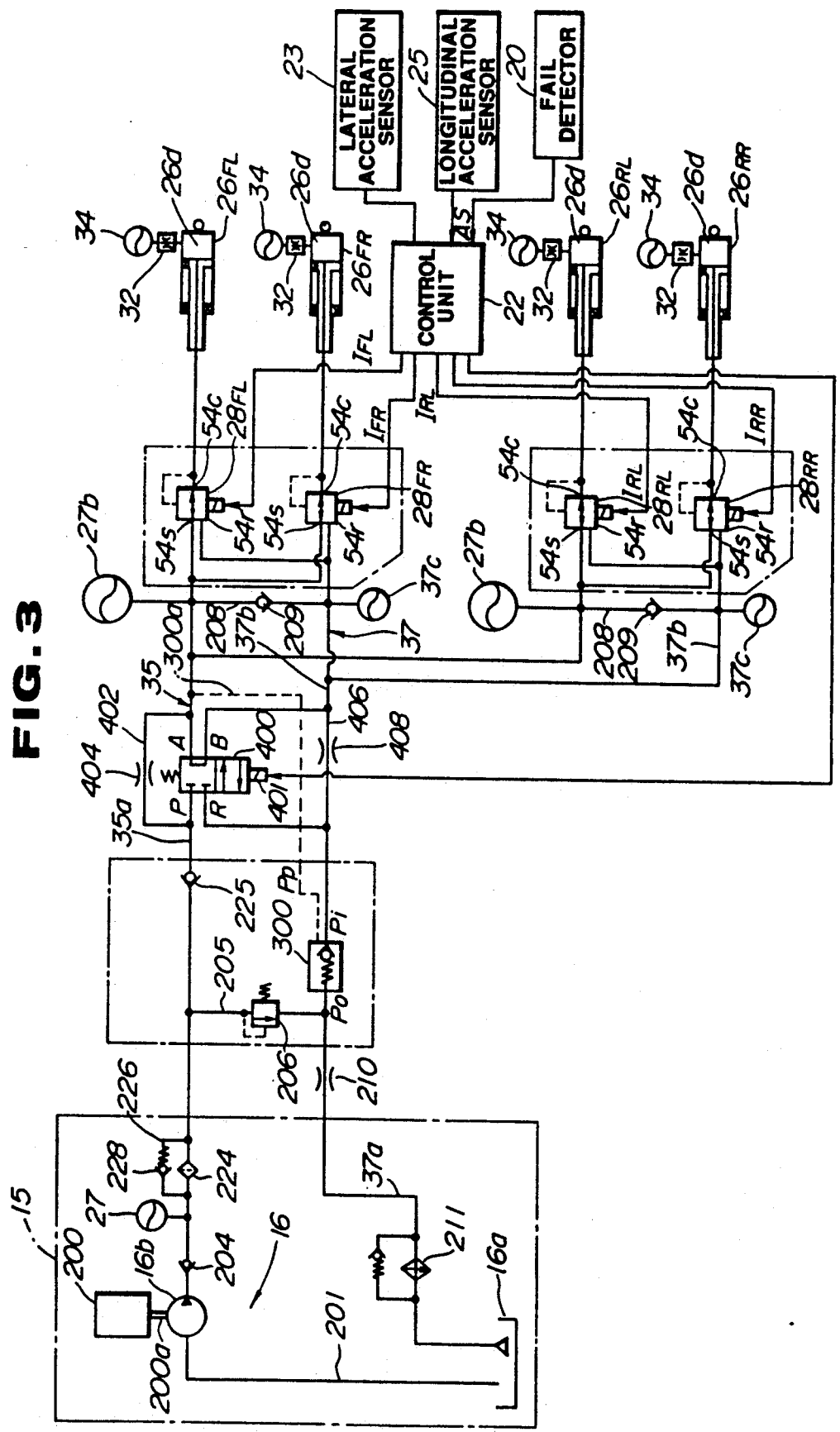
FIG. 3 is an illustration of the preferred embodiment of the working fluid circuit for an active suspension system according to the present invention.

FIG. 3 shows detailed circuit construction of the preferred embodiment of a hydraulic circuit which is applicable for the shown embodiment of the active suspension system, according to the present invention. The hydraulic circuit includes a fluid pressure source circuit 15 which includes the pressure source unit 16. The pressure source unit 16 includes the pressure unit which comprises a fluid pump, and is connected to a fluid reservoir 16a via a suction pipe 201. The fluid pump 16b is associated with an automotive engine 200 so as to be driven by the output torque of the latter output from an engine output shaft 200a. The outlet of the pressure unit 16b, through which the pressurized working fluid is discharged, is connected to the supply port 54s of the pressure control valve 28 via the supply line 35. A one-way check valve 204, a pressure accumulator 27 for absorbing pulsation of the pressurized fluid, a filter 224 are disposed in a portion 35a of the supply line 35. A by-pass passage 226 with a one-way check valve 228 is provided for by-passing the filter 224. A one-way check valve 225 is provided in the supply line at the orientation downstream of the filter 224.

The pressure accumulator 27 are also connected to the supply line 35 to receive therefrom the pressurized fluid for accumulating the pressure. The pressure accumulator 27 serves for absorbing fluctuation of the discharge pressure of the fluid pump 16b and thus regulates the line pressure in the supply line 35. The one-way check valve 204 is disposed in the supply line 35 at the position upstream of the junction between the pressure accumulators 27 and the supply line 35.

A pressure relief line 205 is also connected to the supply line 35 at the position intermediate between the filter 224 and the one-way check valve 225, at one end. The other end of the pressure relief line 205 is connected to the drain line 37. A pressure relief valve 206 is disposed in the pressure relief line 205. The pressure relief valve 206 is responsive to the fluid pressure in the supply line 35 higher than a set pressure to drain the excessive pressure to the drain line for maintaining the pressure in the supply line 35 below the given first line pressure level.

High pressure accumulators 27b are provided in the supply line 35. The high pressure accumulators 27b are designed for receiving the line pressure for accumulating fluid pressure. The high pressure accumulators 27b have set pressure at relatively high level.

On the other hand, the drain line 37 is connected to the drain ports 54r of respective pressure control valves 28. The drain line 37 is connected to the junction between the supply line and the high pressure accumulators 27b via return lines 208 and one-way check valves 209. The one-way check valves 209 are provided set pressure at a possibly highest fluid pressure in the drain line so as to relief the extraordinary fluid pressure to the supply line therethrough. An operational one-way check valve 300 is disposed between the sections 37a and 37b of the drain line 37. The operational one-way check valve 300 is also connected to the supply line 35 at downstream of the one-way check valve 204 to receive therefrom the pressure in the supply line as a pilot pressure, via a pilot line 300a. The operational one-way check valve 300 is designed to be maintained at open position as long as pilot pressure introduced from the supply line 35 at the orientation downstream of the one-way check valve 204 is held higher than a predetermined pressure. At the open position, the operational one-way check valve maintains fluid communication between the inlet side and outlet side thereof so that the working fluid in the drain line 37 may flow therethrough to the reservoir tank 16a. On the other hand, the operational one-way check valve 300 is responsive to the working fluid pressure in the supply line downstream of the one-way check valve 204 serving as the pilot pressure dropping below the predetermined pressure level to be switched into shut-off position. At the shut-off position, the operational one-way check valve 300 blocks fluid communication between the drain port 54r of the pressure control valve 28 and the reservoir tank 16a. In the shown embodiment, the predetermined pressure is set at a pressure corresponding to the neutral pressure of the pressure control valve unit 28. A flow restriction orifice 210 is also provided between the pilot operated one-way check valve 300 and the oil cooler 211 so that the back pressure in the drain line 37 can be maintained at a predetermined value, e.g. several kgf/cm$^2$.

For the section 37b of the drain line 37, a pressure accumulator 37c is provided. The pressure accumulator 37c is arranged for absorbing back pressure to be generated by flow resistance in the drain line 37.

An oil cooler 211 is disposed in the drain line 37 for cooling the working fluid returning to the reservoir tank 16a.

A flow control valve 400 is provided in the supply line 35 at an orientation upstream of the junction between the supply line and the high pressure accumulators 27b. The flow control valve 400 has an inlet port P connected to the pressure unit 15 for receiving therefrom the pressurized fluid. The flow control valve 400 also has an outlet port A connected to the supply port 54s. Furthermore, the flow control valve 400 has a feedback port B connected to the drain port 54r of the pressure control valve 28 and a return port R connected to the pilot operated one-way check valve 300. The flow control valve 400 is variable of valve position between a normal position, in which the inlet port P is connected to the outlet port A and the feedback port B is connected to the return port R, and a flow blocking position, in which the outlet port A is connected to the feedback port B and the inlet port P and the return port R are respectively disconnected from the outlet port and the feedback port. As can be appreciated, at the flow blocking position of the flow control valve 400, fluid communication between the pressure unit 15 and the pressure control valves 28 thererthrough is blocked. The flow control valve is associated with an electromagnetic actuator 401 for switching the valve position between the normal position and the blocking position.

By-passing the flow control valve 400, a by-pass passage 402 is provided for connecting the pressure unit 15 and the pressure control valves 28 by connecting upstream and downstream of the flow control valve for permitting the pressurized fluid from the pressure unit 15 to flow to the pressure control valves. A flow restriction orifice 404 is provided in the by-pass passage 402 for restricting fluid flow therethrough. Also, a by-pass passage 406 is provided for establishing fluid communication for the fluid in the drain line by-passing the flow control valve 400. A flow restriction orifice 408 is provided in the by-pass passage 406 for restricting fluid flow therethrough.

In the hydraulic circuit set forth above, the fluid in pump 16a is driven by the engine 200 to discharge pressurized working fluid while the engine is running. The pressurized fluid discharged from the outlet of the fluid pump 16a is fed to the pressure control valve 28 via the supply line 35 and the one-way check valve 204. When the pressure control valve 28 is shifted to establish fluid communication between the supply port 54s and the pressure control port 54c from the valve position shown in FIG. 2, the pressurized working fluid passes the pressure control valve 28 and introduced into the working chamber 26d of the hydraulic cylinder 26. On the other hand, when the pressure control valve 28 is shifted to block fluid communication between the supply port 54s and the pressure control chamber PC, the fluid pressure in the supply line 35 increases. When the line pressure in the supply line 35 becomes higher than or equal to the set pressure of the pressure relief valve 206 in the pressure relief line 205, the excessive pressure is fed to the drain line 37 via the pressure relief valve 206 and thus returned to the reservoir tank 16a.

The fluid pressure in the supply line 35 is also fed to the operational one-way check valve 300 via the pilot line 300a. As set forth, the operational one-way check valve 300 is placed at open position as long as the pilot pressure introduced through the pilot line 300a is held higher than or equal to the set pressure thereof. Therefore, fluid communication between the pressure control valve 28 and the reservoir tank 16a is maintained. At this position, the working fluid is thus returned to the reservoir tank 16a via the drain line 37 via the operational one-way check valve 300 and the oil cooler 211.

When the engine stops, the pressure unit 16 ceases operation. By stopping the pressure unit 16, the working fluid pressure in the supply line 35 drops. According to drop of the pressure in the supply line 35, the pilot pressure to be exerted to the operational one-way check valve 300 via the pilot line 300a drops. When the pressure in the pilot line 300a drops below or equal to the set pressure, the operational one-way check valve 300 is switched into operational one-way check position to block fluid communication therethrough. As a result, the fluid pressure in the drain line 37 upstream of the operational one-way check valve 300 becomes equal to the pressure in the working chamber 26d. Therefore, even when the working fluid leaks through a gap between the spool valve 52 and the inner periphery of the valve bore, it is not affect the fluid pressure in the working chamber.

In the normal operation of the suspension control system under running state of the engine, the flow control valve 400 is maintained at the normal position for permitting fluid communication between the pressure unit 15 and the pressure control valves 28 via the supply line 35 and the drain line 37. Also, as long as the engine running, the supply pressure from the pressure unit 15 is maintained high than the set pressure of the operational one-way check valve 300. Therefore, at this position, the operational one-way check valve 300 permits fluid flow from the pressure control valves 28 to the fluid reservoir 16a. At this condition, the pressurized working fluid source unit 16 supplies the predetermined line pressure. For example, the line pressure in the supply line 35 may be set at a pressure of 80 kgf/cm$^2$.

When the vehicle steadily travels on a smooth straight road, the current value of the control signal to be applied to the actuator 29 of the pressure control valve 28 is maintained at the neutral value $I_N$. As long as the neutral value $I_N$ of the control signal is applied to the actuator 29, the proportioning solenoid coil 68 is energized at a magnitude corresponding the neutral value $I_N$ of the control signal to place the poppet valve 48 at the corresponding position. At this position, the flow resistance at the communication path opening 46A, path area of which is restricted by the valve head 48a of the poppet valve 48 becomes the neutral value. At this position of the poppet valve 48, the pilot pressure $P_p$ within the pilot chamber PR is maintained at the neutral pressure $P_N$. At this condition, if the control pressure Pc in the pressure control port 54c is held equal to the fluid pressure in the working chamber 26d of the hydraulic cylinder 26, the fluid pressure in the upper and lower feedback chambers FU and FL are held in balance to each other. The valve spool 52 is maintained at the neutral position to shut fluid communication between the supply port 54s, the drain port 54r and the pressure control port 54c. Therefore, the control pressure Pc is maintained at the neutral pressure $P_N$.

At this condition, when relatively high frequency and small magnitude road shock input through the vehicular wheel, is absorbed by fluid communication between the working chamber 26d and the pressure accumulator 34 via the orifice 32. The flow restriction in the orifice 32 serves to absorb the bounding and rebounding energy. Therefore, high frequency and small magnitude road shock can be effectively absorbed so as not to be transmitted to the vehicle body.

When the piston 26c strokes in rebounding direction compressing the working chamber 26d, the fluid pressure in the working chamber increases to increase the control pressure Pc in the pressure control port 54c. Therefore, the control pressure Pc becomes higher than the pilot pressure $P_p$ in the pilot chamber PR. This results in increasing of the fluid pressure in the lower feedback chamber FL at a magnitude higher than that in the upper feedback chamber FU. This causes upward movement of the valve spool 52 to establish fluid communication between the drain port 54r and the pressure control port 54c. Therefore, the pressure in the pressure control port 54c is drained through the drain line 37. This causes pressure drop at the pressure control port 54c so that the control pressure Pc becomes lower than the pilot pressure $P_p$ in the pilot chamber PR. Then, the fluid pressure in the upper feedback chamber FU becomes higher than that in the lower feedback chamber FL. Therefore, the valve spool 52 is shifted downwardly to establish fluid communication between the supply port 54s and the pressure control port 54c. The pressurized working fluid in the supply line 35 is thus supplied to the working chamber 26d via the pressure control port 54c to increase the fluid pressure. By repeating the foregoing cycles, pressure balance is established between the pressure control port 54c and the pilot chamber PR. Therefore, the control pressure Pc as well as the fluid pressure in the working chamber 26d are adjusted to the pilot pressure.

During the pressure adjusting operation set forth above, the fixed throttling orifice Pro serves for restricting fluid flow from the pressure control port 54c to the drain line 37. This flow restriction at the orifice Pro serves as resistance against the rebounding stroke of the piston 26c to damp or absorb energy causing rebounding motion of the vehicle body. Furthermore, as set out, working fluid in the pilot chamber PR is generally introduced through the pilot path PP via the multi-stage orifice Qp and return through the pilot return path PT via the lower section 42Ul of the control chamber 42U and via the multi-stage orifice Pr. As long as the fluid flow in the pilot return path PT is not disturbed and thus steady. The most upstream side orifice is mainly effective for restricting the fluid flow. Therefore, magnitude of flow restriction is relatively small so as to provide sufficient response characteristics in reduction of the pilot pressure. On the other hand, when the working fluid flowing from the control chamber 42U confluence with the working fluid from the pilot chamber PR, back pressure is produced in the drain port 54r, the fluid flowing through the pilot return path PT is disturbed and thus becomes unstable. This tends to cause serving of the pressurized fluid from the drain port 54r to the pilot chamber PR. In such case, all of the orifices in the multi-stage orifice Pr is effective to create greater flow restriction that than for the steady flow. This avoid influence of the back pressure created in the drain port 54r.

Similarly, in response to the bounding stroke of the piston 26c, the valve spool 52 is shifted up and down to absorb bounding energy and maintains the fluid pressure in the working chamber 26d of the hydraulic cylinder 26 at the neutral pressure.

On the other hand, when the anti-rolling suspension control is taken place in response to the lateral acceleration exerted on the vehicle body, the control signal current value is derived on the basis of the magnitude of the lateral acceleration monitored by the lateral acceleration sensor 23. Generally, in order to suppress rolling motion of the vehicular body, the fluid pressure in the working chamber 26d of the hydraulic cylinder 26 which is provided for the suspension mechanism at the side where the vehicular height is lowered across the neutral position, is increased to suppress lowering motion of the vehicle body. On the other hand, the fluid pressure in the working chamber 26d of the hydraulic cylinder 26 which is provided for the suspension mechanism at the side where the vehicular height is risen across the neutral position, is decreased to suppress rising motion of the vehicle body. Therefore, in order to control the pressures in the working chambers 26d of the both side hydraulic cylinders 26, control signal current values are increased and decreased across the neutral value $I_N$.

Figure 4:
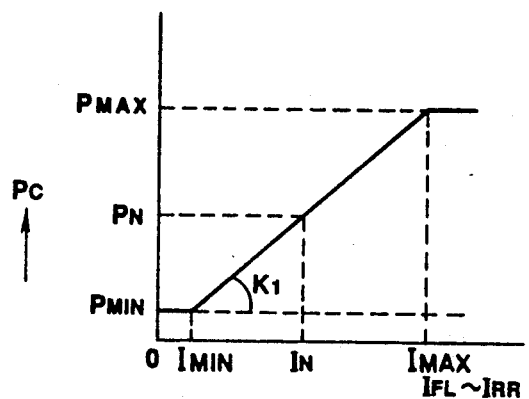
FIG. 4 is a chart showing pressure variation in a working chamber of the active cylinder in relation to a control command.

The control unit 22 performs attitude change suppressive suspension control by adjusting the pilot pressure in the pressure control valve 28. In the shown control system, the control signal value, i.e. control signal current level I varies between a predetermined minimum level $I_{MIN}$ and a predetermined maximum level $I_{MAX}$ for adjusting the control pressure to be supplied to the working chamber 26d between a minimum pressure level $P_{MIN}$ and a maximum pressure level $P_{MAX}$, as shown in FIG. 4.

For example, when rolling motion is caused by left turn of the vehicle, control current for the actuators 29 of the pressure control valves 28 controlling the fluid pressures in the front-right and rear-right hydraulic cylinders 26FR and 26RR are to be increased to be greater than the neutral current $I_N$, and the control current for the actuator of the pressure control valves 28 controlling the fluid pressures in the front-left and rear-left hydraulic cylinders 26FL and 26RL are to be decreased to be smaller than the neutral current $I_N$. By the control current supplied to respective actuators 29, the proportioning solenoid coils 68 are energized at the magnitudes corresponding to the control signal currents to place the poppet valves 48 at respective corresponding positions. By variation of the positions of the poppet valves 48, flow restriction magnitude at respective communication path openings 46A is varied to vary the pilot pressures Pp in the pilot chamber PR. As set forth, since the fluid pressures in the working chambers 26d become equal to the pilot pressures Pp, the suspension characteristics at respective hydraulic cylinders 26 can be adjusted.

Anti-pitching, bouncing suppressive suspension control can be performed substantially in the same manner to that discussed with respect to the anti-rolling control.

Power supply for the control unit 22 is so programmed as to maintain power supply for a predetermined period of time after turning OFF of a main power switch, i.e. an ignition switch. The predetermined period for maintaining the power supply after turning OFF of the main power switch will be hereafter referred to as "OFF-set transition period". During the OFF-set transition period, the control unit 22 thus maintains operation for suspension control. The control unit 22 is further designed to start control operation with a predetermined delay period after turning ON of the main power switch. This delay period will be hereafter referred to as "ON-set transition period". Because of absence of a pressure supply control signal CP of the control unit 22, the actuator 401 is maintained in deenergized position to maintain the flow control valve 400 at the blocking position. During the ON-set transition period, the fluid pressure supplied from the pressure unit 15 is rapidly increased by running of the engine. Therefore, the line pressure at the upstream of the flow control valve 400 is rapidly increased to the set line pressure. At this time, since the flow control valve 400 is maintained at the blocking position, only limited amount of the pressurized fluid is supplied to the supply line at the downstream of the flow control valve 400 via the by-pass passage 402 and the flow restriction orifice 404. After the ON-set transition period, the pressure supply control signal CP is supplied to the actuator 401 to energize the latter. BY this, the flow control valve 400 is turned into the normal position for establishing fluid communication therethrough.

Figure 5:
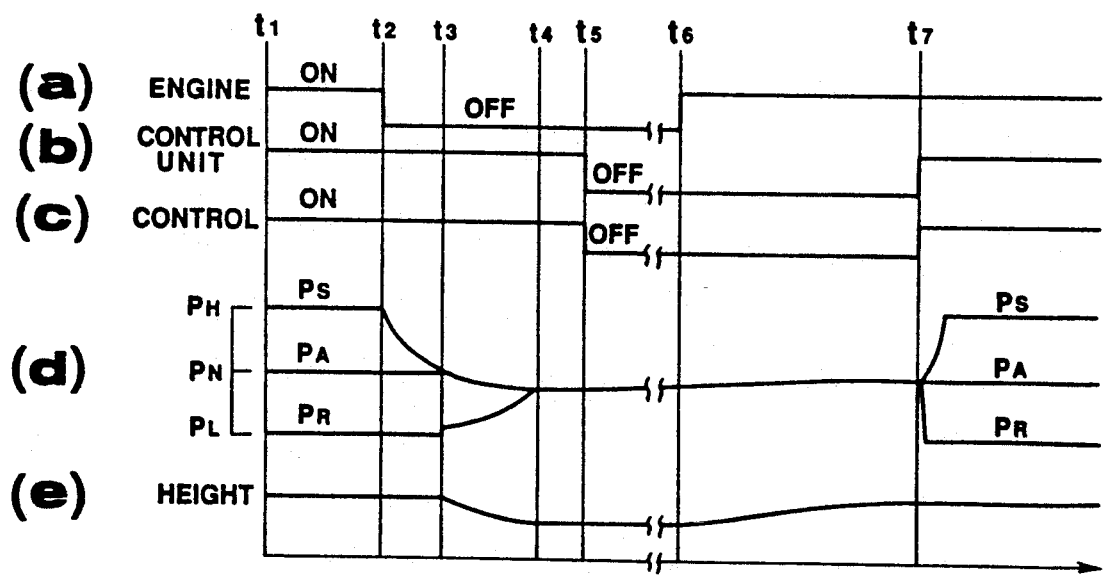
FIG. 5 is a timing chart showing operation of the preferred embodiment of the active suspension system of FIG. 1.

The operation of the control unit 22 will be further discussed with reference to FIGS. 5(a) to 5(e). In the shown time chart, FIG. 5(a) shows state of the main power supply. As can be seen, at a time $t_1$, power supply is maintained at ON state for supplying power to the control unit 22. By this, the pressure supply control signal CP is supplied to the actuator 401 maintain the flow control valve 400 at the normal position. Also, because of ON state of the main power supply, the engine is maintained in running state. Therefore, the fluid pump 16b is maintained in driving state for feeding the pressurized fluid. As a result, the line pressure in the supply line 35 is maintained at the set line pressure $P_H$ as shown in FIG. 5(d). The line pressure at the level of $P_H$ is supplied to the inlet port 54s of each pressure control valve 28. The pressure accumulators 27b accumulate the pressure at the level of $P_H$. The line pressure is also supplied to the pilot chamber of the operational one-way check valve 300 to maintain the latter open. At this condition, active suspension control is performed in a manner set forth above.

At a step $t_2$, the main power supply is terminated as shown in FIG. 5(a). In response to termination of the main power supply, the engine stops. As a result, the fluid pump 16b stops to lower the supply pressure to the atmospheric pressure. However, since the one-way check valves 204 and 225 are provided in the supply line 35, rapid lowering of the line pressure can be successfully prevented. As set position, the control unit 22 is maintained in active state to continue control operation during the OFF-set transition period (until $t_5$). BY maintaining the control unit 22 in active state, active suspension control is maintained to consume a certain amount of working fluid. Therefore, the line pressure is lowered gradually, as shown in FIG. 5(d). By this, the vehicular height can be maintained at the regulated level. When the line pressure drops below the neutral pressure $P_N$ at a time $t_3$, the vehicular height level starts to be lowered according to lowering of the line pressure, as shown in FIG. 5(e). At the time $t_3$, in response to lowering of the line pressure across the neutral pressure $P_N$, the operational one-way check valve 300 is shut-off to block fluid flow therethrough. By this, the fluid pressure in the drain line upstream of the operational one-way check valve 300 starts to increase toward the neutral pressure, as shown in FIG. 3(d). The increased fluid pressure is then absorbed by the pressure accumulators 37c. By absorption of the fluid pressure by the pressure accumulators 37c, the line pressure is further lowered. At a time $t_4$, pressure balance is established in the closed circuit extending across the pressure control valve 28 is established. Therefore, after $t_4$, the line pressure is maintained substantially in constant.

At a time $t_5$, the predetermined OFF-set transition period expires to terminate operation of the control unit 22 as shown in FIG. 5(c). Then, the control unit 22 cease control operation. At this position, since the control unit 22 is not active, and the flow control valve 400 and the operational one way check valve 300 are both in blocking state. Therefore, the fluid pressure in the closed circuit is maintained at constant level at the pressure level lower than the neutral pressure level $P_N$. As a result, the vehicular height level is maintained constant at a level lower than a target height.

At a step $t_6$, the main power switch is again turned ON. As a result, the engine starts to run to drive the fluid pump 16b. As a result, the fluid pressure at the upstream of the flow control valve 400 is increased toward the set line pressure $P_H$. However, since the initiation of power supply is delayed for the predetermined ON-set transition period, the pressurized fluid is supplied only through the flow restriction orifice 404, rate of increasing of the fluid pressure at the downstream of the flow control valve 400 is maintained at low rate. Therefore, the line pressure to be supplied to the inlet port 54s of the pressure control valve 28 increases steadily or gradually at much lower rate than the fluid pressure increasing rate at the upstream of the flow control valve, as shown in FIG. 5(d). By increasing of the line pressure, the vehicular height level is gradually risen toward the target height level.

As can be seen from FIG. 5(d), during the ON-set transition period, the line pressure at the downstream of the flow control valve 400 reaches the neutral pressure level $P_N$. Accordingly, the vehicular height level is resumed to the target height. In other words, the ON-set transition period is set to be long enough to resume the line pressure to the neutral pressure and whereby to resume the vehicular height at the target level. After expiration of the ON-set transition period at $t_7$, the pressure supply control signal CP is supplied to the actuator 401 to switch the position of the flow control valve 400 to the normal position. Thereafter, normal suspension control is performed.

On the other hand, the control unit 22 is responsive to the fail detection signal AS of the fail detector 20 to terminate the pressure supply control signal CP. As a result, the flow control valve is operated to the blocking position. At the same time, the control unit 22 outputs the suspension control signal CS to set the pressure control valve 28 in a position that the inlet port 54s is communicated with the drain port 54r. By this, the line pressure in the supply line downstream of the flow control valve is lowered to cause switching of the position of the operational one-way check valve 300 to the blocking position. By this, the vehicular height level can be maintained at approximately neutral position when the suspension system causes failure.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

Figure 6:
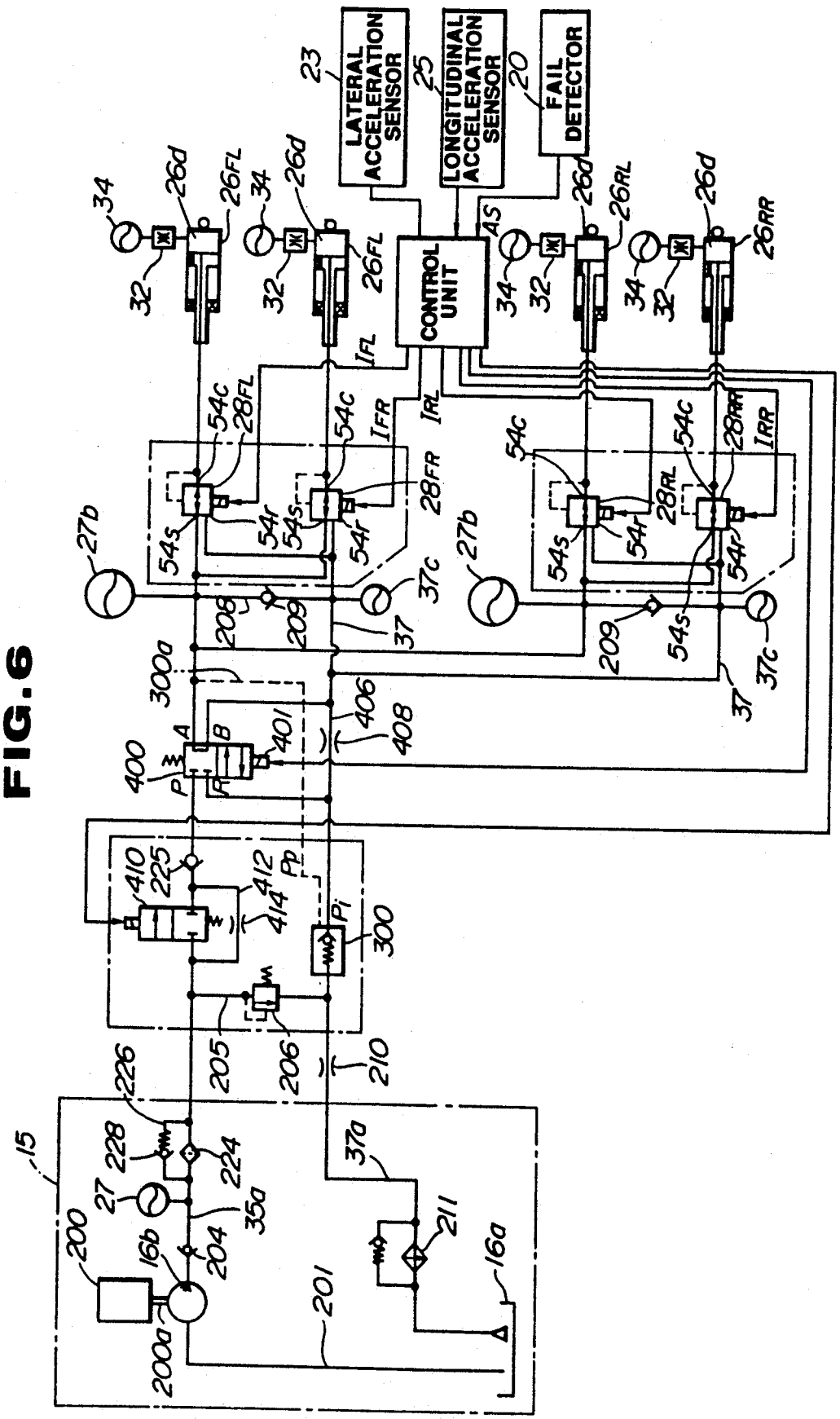
FIG. 6 is an illustration of another embodiment of the working fluid circuit for an active suspension system according to the present invention.

FIG. 6 shows modification of the foregoing preferred embodiment of the working fluid circuit in the active suspension system according to the present invention. In this embodiment, an electromagnetic valve 410 for establishing and blocking fluid communication therethrough is provided in the orientation upstream of the flow control valve 400. In parallel to the electromagnetic valve 410, a by-pass passage 412 with a flow restriction orifice 414 is provided. The parallel combination of the electromagnetic valve 410 and the flow restriction orifice 414 are provided in place of the by-pass passage 402 and the flow restriction orifice 404 in the former embodiment.

In the shown construction, the electromagnetic valve 410 is controlled by the pressure supply control signal CP for providing the ON-set transition period. Since ON-set transition period is provided for the electromagnetic valve, it becomes unnecessary to provide ON-set transition delay for the flow control valve.

It should be noted that the working fluid circuit set out hereabove may be applicable for active suspension systems performing variety of suspension control operations and having variety of constructions. For example, the present invention may be applicable for any of the below listed active suspension systems.

U.S. patent application Ser. No. 052,934, filed on May 22, 1989, now U.S. Pat. No. 4,903,943:

U.S. patent application Ser. No. 059,888, filed on June 9, 1987, now abandoned corresponding European Patent Application has been published as First Publication No. 02 49 209:

U.S. patent application Ser. No. 060,856, filed on June 12, 1987, now abandoned corresponding European Patent Application has been published as First Publication No. 02 49 227:

U.S. patent application Ser. No. 060,909, filed on June 12, 1987, now U.S. Pat. No. 4,909,534:

U.S. patent application Ser. No. 060,911, filed on June 12, 1987, now U.S. Pat. No. 4,801,155:

U.S. patent application Ser. No. 176,246, filed on Mar. 31, 1988, now U.S. Pat. No. 4,888,696, the corresponding European Patent Application has been published as First Publication No. 02 85 153:

U.S. patent application Ser. No. 178,066, filed on Apr. 5, 1988, now U.S. Pat. No. 4,848,790, the corresponding European Patent Application has been published as First Publication No. 02 86 072:

U.S. patent application Ser. No. 167,835, filed on Mar. 4, 1988, now U.S. Pat. No. 4,865,348:

U.S. patent application Ser. No. 244,008, filed on Sept. 14, 1988, now U.S. Pat. No. 4,938,499:

U.S. patent application Ser. No. 255,560, filed on Oct. 11, 1988, now U.S. Pat. No. 4,943,084:

U.S. patent application Ser. No. 266,763, filed on Nov. 3, 1988, now U.S. Pat. No. 4,967,360:

U.S. patent application Ser. No. 261,870, filed on Oct. 25, 1988:

U.S. patent application Ser. No. 263,764, filed on Oct. 28, 1988, now U.S. Pat. No. 4,905,152:

U.S. patent application Ser. No. 277,376, filed on Nov. 29, 1988, now U.S. Pat. No. 4,919,440:

U.S. patent application Ser. No. 303,338, filed on Jan. 26, 1989:

U.S. patent application Ser. No. 310,130, filed on Mar. 22, 1989, now U.S. Pat. No. 4,973,079:

U.S. patent application Ser. No. 327,460, filed on Mar. 22, 1989, now U.S. Pat. No. 4,911,469:

U.S. patent application Ser. No. 303,339, filed on Jan. 26, 1989, now U.S. Pat. No. 4,948,165:

U.S. patent application Ser. No. 331,602, filed on Mar. 31, 1989, now U.S. Pat. No. 4,911,468:

U.S. patent application Ser. No. 331,653, filed Mar. 31, 1989, now U.S. Pat. No. 4,911,470:

U.S. patent application Ser. No. 364,477, filed on June 12, 1989:

U.S. patent application Ser. No. 365,468, filed on June 12, 1989.

What is claimed is:

1. A working fluid circuit system for an active suspension system of an automotive vehicle, comprising:
   an active cylinder disposed between a vehicular body and a vehicular wheel and defining therein a working chamber filled with a working fluid contained at a variable pressure therein;
   a pressure source unit for pressurizing the working fluid for circulation, said pressure source unit being connected to a power switch for maintaining operation while the power switch is maintained in an ON position;
   a fluid circuit connecting said working chamber and said pressure source unit for circulating the working fluid therethrough;
   a pressure control valve disposed within said fluid circuit for adjusting a fluid pressure in said working chamber, said pressure control valve being operable between a first position for introducing pressurized fluid for increasing said fluid pressure in said working chamber, a second position for draining pressurized fluid from said working chamber for decreasing said fluid pressure and a third position for blocking fluid communication between said pressure source unit and said working chamber;
   fluid supply control means disposed in said fluid circuit between said pressure source unit and said pressure control valve, said fluid supply control means being operable in a first position for supplying pressurized fluid from said pressure source unit to said pressure control valve and in a second position for blocking fluid supply therethrough, said fluid supply control means being maintained at said second position while said power switch is maintained at an OFF position and responsive to switching of said power switch to said ON position thereof to switch the position of said fluid supply control valve from said second position to said first position with a predetermined delay period; and
   flow restriction means arranged in parallel with said fluid supply control means, for restricting fluid flow therethrough during said predetermined delay period.

2. A working fluid circuit system as set forth in claim 1, which further comprises an operational one-way check valve disposed in a drain line of said fluid circuit between said pressure control valve and said pressure source unit for selectively permitting and blocking fluid flow from said pressure control valve back to said pressure source unit, said operational check valve being variable of valve position between flow permitting position and flow blocking position depending upon the fluid pressure supplied to said pressure control valve through a supply line of said fluid circuit.

3. A working fluid circuit system as set forth in claim 1, wherein said fluid supply control means comprises a flow control valve operable between said first and second positions, and said flow restriction means comprises a by-pass passage by-passing said flow control valve and a flow restriction orifice disposed in said by-pass passage for permitting limited flow rate of fluid flow therethrough.

4. A working fluid circuit system as set forth in claim 3, wherein said flow control valve is maintained at said second position for said predetermined period after turning ON of said power switch, which predetermined period is set so that the working fluid supplied through said by-pass passage establishes a fluid pressure to be supplied to said pressure control valve higher than a predetermined pressure level.

5. A working fluid circuit system as set forth in claim 1, wherein said fluid supply control means comprises a flow control valve operable between first and second positions and a timing control valve, and said flow restriction means comprises a by-pass passage by-passing said timing control valve and a flow restriction orifice disposed in said by-pass passage for permitting limited flow rate of fluid flow therethrough.

6. A working fluid circuit system as set forth in claim 5, wherein said flow control valve is maintained at said second position for said predetermined period after turning ON of said power switch, which predetermined period is set so that the working fluid supplied through said by-pass passage establishes a fluid pressure to be supplied to said pressure control valve higher than a predetermined pressure level.

7. A working fluid circuit system as set forth in claim 1, which further comprises failure detecting means for detecting failure of the active suspension system, and wherein said flow control valve is responsive to said failure detecting means detecting failure to switch position from said first position to said second position irrespective of said power switch position.

8. An active suspension system for an automotive vehicle, comprising:
   an active cylinder disposed between a vehicular body and a vehicular wheel and defining therein a working chamber filled with a working fluid contained at a variable pressure therein;
   a pressure source unit for pressurizing the working fluid for circulation, said pressure source unit being connected to a power switch for maintaining operation while the power switch is maintained in an ON position;
   a fluid circuit connecting said working chamber and said pressure source unit for circulating the working fluid therethrough;
   a pressure control valve disposed within said fluid circuit for adjusting a fluid pressure in said working chamber, said pressure control valve being operable between a first position for introducing pressurized fluid for increasing said fluid pressure in said working chamber, a second position for draining pressurized fluid from said working chamber for decreasing said fluid pressure and a third position for blocking fluid communication between said pressure source unit and said working chamber;
   an active suspension control unit monitoring vehicular driving condition to produce a control signal for controlling operation of said pressure control valve so as to regulate vehicular height and vehicular attitude;
   a fluid supply control means disposed in said fluid circuit between said pressure source unit and said pressure control valve, said fluid supply control means being operable in a first position for supplying pressurized fluid from said pressure source unit to said pressure control valve and in a second position for blocking fluid supply therethrough, said fluid supply control means being controlled by said active suspension control unit;
   said active suspension control unit being responsive to switching of said power switch to said ON position thereof to command switching of position to said fluid supply control means from said second position to said first position with a predetermined delay period; and flow restriction means arranged in parallel with said fluid supply control means, for restricting fluid flow therethrough during said predetermined delay period.

9. An active suspension system as set forth in claim 8, wherein said active suspension control unit is responsive to turning OFF of said power switch for maintaining operation for a predetermined OFF-set transition period.

10. An active suspension system as set forth in claim 9, wherein said active suspension control unit is responsive to turning OFF of said power switch to switch the position of said fluid supply control means from said first position to said second position.

11. An active suspension system as set forth in claim 10, which further comprises an operational one-way check valve disposed in a drain line of said fluid circuit between said pressure control valve and said pressure source unit for selectively permitting and blocking fluid flow from said pressure control valve back to said pressure source unit, said operational check valve being variable of valve position between flow permitting position and flow blocking position depending upon the fluid pressure supplied to said pressure control valve through a supply line of said fluid circuit.

12. An active suspension system as set forth in claim 11, wherein said fluid supply control means comprises a flow control valve operable between first and second positions, and said flow restriction means comprises a by-pass passage by-passing said flow control valve and flow restriction orifice disposed in said by-pass passage for permitting limited flow rate of fluid flow therethrough.

13. An active suspension system as set forth in claim 12, wherein said flow control valve is maintained at said second position for said predetermined period after turning ON of said power switch, which predetermined period is set so that the working fluid supplied through said by-pass passage establishes a fluid pressure to be supplied to said pressure control valve higher than a predetermined pressure level.

14. An active suspension system as set forth in claim 11, wherein said fluid supply control means comprises a flow control valve operable between first and second positions and a timing control valve, and said flow restriction means comprises a by-pass passage by-passing said timing control valve and a flow restriction orifice disposed in said by-pass passage for permitting limited flow rate of fluid flow therethrough.

15. An active suspension system as set forth in claim 14, wherein said flow control valve is maintained at said second position for said predetermined period after turning ON of said power switch, which predetermined period is set so that the working fluid supplied through said by-pass passage establishes a fluid pressure to be supplied to said pressure control valve higher than a predetermined pressure level.

16. An active suspension system as set forth in claim 11, which further comprises failure detecting means for detecting failure of the active suspension system, and a flow control valve responsive to said failure detecting means detecting failure to switch position from said first position to said second position irrespective of said power switch position.

17. An active suspension system as set forth in claim 11, which further comprises a pressure accumulator connected to said drain line at an orientation upstream of said operational one-way check valve for absorbing back pressure in said drain line.

* * * * *